(No Model.)

J. W. HESTER.
NUT LOCK.

No. 506,231.　　　　　Patented Oct. 10, 1893.

Witnesses　　　　　　　　　　　　　　Inventor
　　　　　　　　　　　　　Jos. W. Hester,
　　　　　　　By his Attorneys,

United States Patent Office.

JOSEPH W. HESTER, OF CITRONELLE, ALABAMA, ASSIGNOR OF ONE-HALF TO
J. L. GRACE, OF SAME PLACE.

NUT-LOCK.

SPECIFICATION forming part of Letters Patent No. 506,231, dated October 10, 1893.

Application filed May 27, 1893. Serial No. 475,704. (No model.)

*To all whom it may concern:*

Be it known that I, JOSEPH W. HESTER, a citizen of the United States, residing at Citronelle, in the county of Mobile and State of Alabama, have invented a new and useful Nut-Lock, of which the following is a specification.

The invention relates to improvements in nut locks.

The object of the present invention is to provide a simple, inexpensive, strong, and durable nut-lock which may be readily carried in large numbers and which may be applied to the nuts of an ordinary rail-joint without necessitating change of the latter, and which will effectually prevent the nuts from unscrewing.

The invention consists in the construction and novel combination and arrangement of the parts hereinafter fully described, illustrated in the accompanying drawings, and pointed out in the appended claims.

Figure 1:
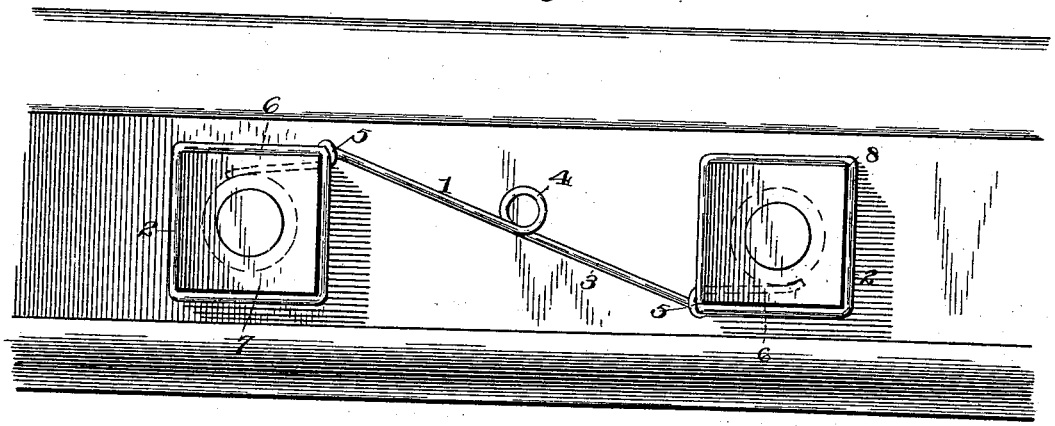
Figure 2:
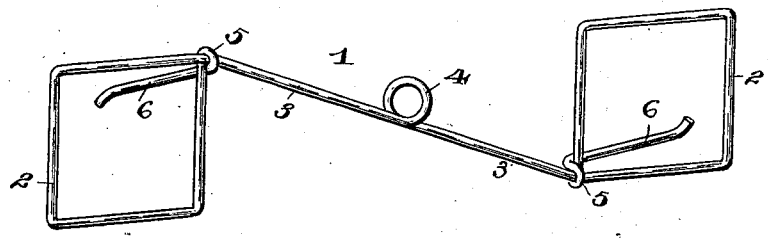

In the drawings: Figure 1 is an elevation of a portion of a rail-joint provided with a nut-lock constructed in accordance with this invention. Fig. 2 is a perspective view of the nut-lock detached.

Similar numerals of reference designate corresponding parts in both figures of the drawings.

1 designates a nut-lock consisting of opposite end nut-receiving loops 2, connecting stems 3, and a central bend or partial coil 4, which imparts resiliency to the sides of the nut-lock, forming springs thereof and enabling the nut-lock to be varied in length to accommodate itself to the varying distances between nuts. The nut-lock is constructed of a single piece of wire, which is bent at its middle to form the partial coil 4, and which has each end provided with a substantially rectangular nut-receiving loop 2. The wire, after forming the loop at each end, is bent around the stem to form an eye 5, and is continued to form an extension or arm 6. The eye 5 enables the loop to be increased in size or contracted to fit a nut snugly, and the arm 6 is resilient and is designed to be inserted back of a nut to prevent the nut-lock from becoming disengaged from or leaving the nut.

In Fig. 1 of the accompanying drawings, the nut-lock is shown arranged on nuts 7 and 8, and the eyes 5 are formed at the inner upper and lower corners of the nut-receiving loops, the stems or connecting-portion extending downward at an inclination from the top of the nut 7 to the bottom of the nut 8. The arrangement of the nut-receiving loops and the inclined connecting portion effectually prevent the nuts from unscrewing, and any tendency of one nut to unscrew will serve to tighten the other nut. Should the nut 8 turn in unscrewing it will draw the nut 7 in a direction to tighten the latter, and if the nut 7 turns in a direction to unscrew it, the other nut is screwed up. Thus it will be apparent that the tendency of one nut to unscrew is counteracted by the tightening effect it has on the other nut.

It will be apparent that as the nut-lock is constructed of wire, it is exceedingly cheap, that it is simple and capable of being readily and rapidly manufactured and placed on nuts, and that owing to its lightness a great number may be readily and conveniently carried. It will also be seen that the nut-lock does not require alterations of the nuts or bolts, or the arrangement of the same in a rail-joint, but may be readily applied to the ordinary form of rail-joints, and that it possesses great durability and will not require constant replacement.

Changes in the form, proportion and the minor details of construction may be resorted to without departing from the principle or sacrificing any of the advantages of this invention.

A tool may be readily inserted in the bend or partial coil of the inclined connecting piece for twisting the wire to tighten the nut-lock.

Sufficient space is left between the nuts and the fish-plate to receive the arms of the nut-lock, by washers which are interposed between the nuts and the fish-plates.

What I claim is—

1. A nut-lock, constructed of wire and comprising a pair of nut-receiving loops, and an inclined connecting portion extending from the top of one of the loops to the bottom of the other and provided with a bend imparting resiliency to the nut-lock, substantially as described.

2. A nut-lock, constructed of wire and comprising nut-receiving loops, and an inclined connecting portion extending from the top of one of the loops to the bottom of the other loop, said loops terminating in eyes arranged on the inclined connecting portion, whereby the size of the loops may be varied, substantially as described.

3. The combination of a rail joint having a pair of bolts and nuts, washers of less diameter than the nuts arranged on the bolts and interposed between the nuts and the adjacent fish plate and forming a space back of the nuts, and a nut lock comprising a pair of nut receiving loops conforming to the configuration of said nuts and arranged on the edges of the same and provided with resilient arms extending back of the nuts and arranged in said spaces to retain the loops on the nuts, and a connecting portion extending from one loop to the other, substantially as described.

4. A nut-lock, constructed of a single piece of wire and comprising a pair of nut-receiving loops, an inclined connecting portion extending from the top of one loop to the bottom of the other and provided intermediate of its ends with a bend to impart resiliency to the nut-lock, said loops being provided at their inner sides at the extremities of the wire of which they are formed with eyes receiving the inclined connecting portion and provided with arms to be inserted back of nuts, substantially as and for the purpose described.

In testimony that I claim the foregoing as my own I have hereto affixed my signature in the presence of two witnesses.

JOSEPH W. HESTER.

Witnesses:
G. B. MICHAEL,
MURRAY S. MICHAEL.